Patented Jan. 3, 1928.

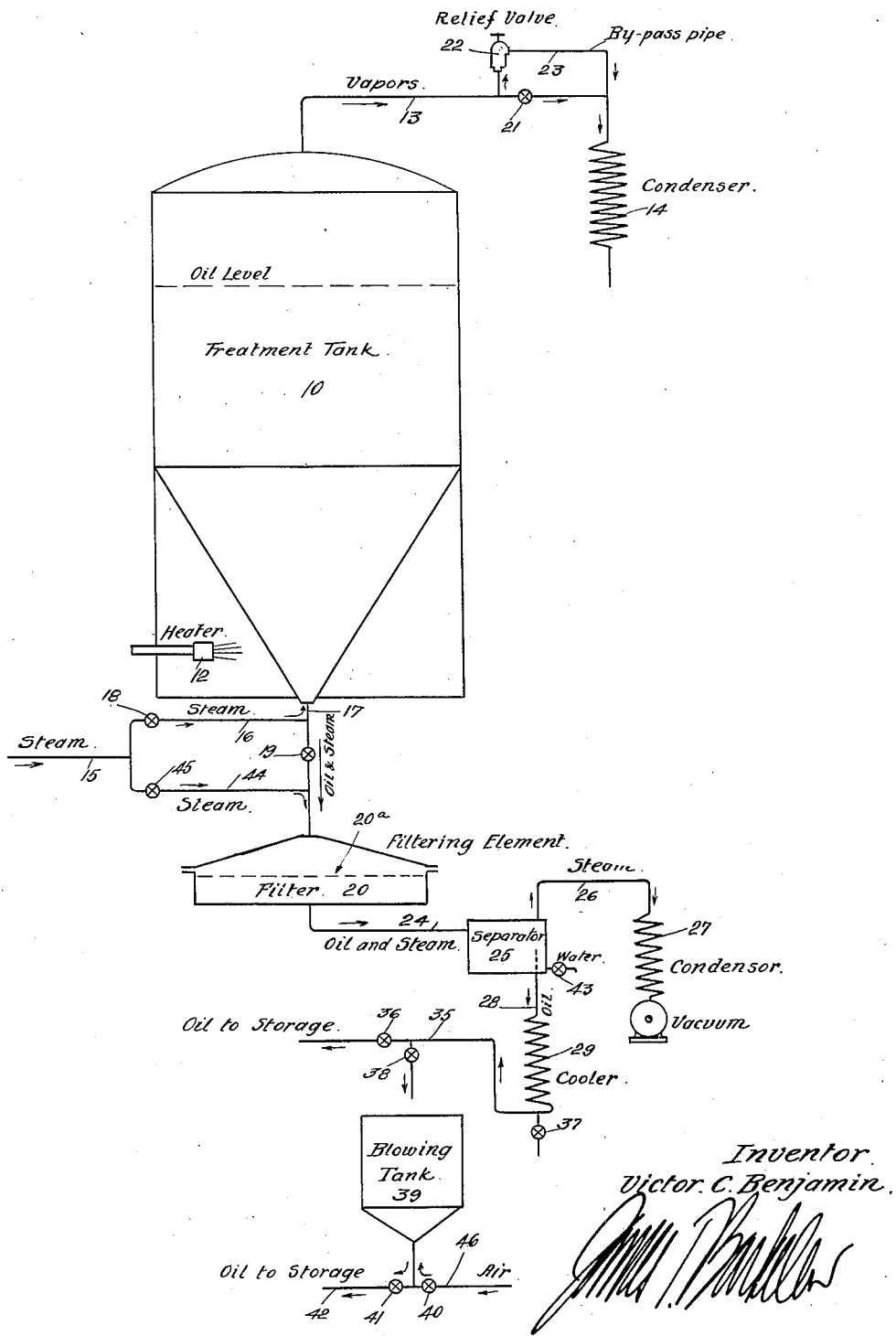

1,655,175

UNITED STATES PATENT OFFICE.

VICTOR C. BENJAMIN, OF LOS ANGELES, CALIFORNIA.

METHOD OF DEODORIZING AND FILTERING OILS.

Application filed September 29, 1925. Serial No. 59,288.

This invention has to do with deodorizing hydrocarbon and other oils, where the treatment used for the purification of such oils causes decomposition that induces odor in the treated products.

As an instance of the application of the invention, I may state the following: In the treatment with adsorbent clays (solids) of lubricating stocks from petroleum oils it has been found either desirable or necessary to carry the treating temperatures fairly high. For instance, in an average case the finishing temperature of a lubricating oil may be as high as 650° F., though clay treatments may be effectively carried out at lower temperatures. At such a temperature the more volatile hydrocarbons undesired in a lubricating oil are driven off and it is found that the efficiency of the adsorbent clay used in the treatment is much increased. Thus it is desirable to treat such lubricating oils at comparatively high temperatures in order to produce a clear final product. But it has been found that such high temperatures, particularly when the oil is used with finely divided clay, induces decomposition that causes oil to have an undesirable odor; and it is among the objects of this invention to provide a simple procedure for removing such odor.

Without thereby placing a limitation upon my present invention, I may easily explain it in connection with such a process as is described in my application entitled Process of purifying oils, Serial Number 737,444, filed September 13, 1924. In that process I treat a lubricating stock, such as an original stock or a used lubricating oil, by gradually bringing it up to the desired finishing temperature, keeping it in constant agitation during the period of heating, taking off the vapors during the heating, and then finally filtering the treating clay and all filterable impurities from the remaining liquid. During the whole of the heating period the clay in finely divided form is admixed with the oil. During a part, at least, of the heating period, as explained in said application, I agitate the oils by passing steam through them, the steam also serving to carry away volatile impurities. Then, in that process, I explain how steam circulation is shut off at the finish of treatment and the oils are then filtered. After steam circulation is shut off and during the filtering operation the oils are still at high temperature (being preferably filtered at least at a fairly high temperature), and are in contact with the clay until filtration is completed, but are not in contact with the steam.

I have found that by keeping the live steam in intimate contact with the oils until the filtering operation is completed, steam carries away from the oils all the odorous products of decomposition, and then, after filtration and consequent removal of clay, contact of steam may be cut off, as no more odorous decomposition is then taking place.

In order to describe more specifically a preferred and illustrative procedure in accordance with my invention, I have shown diagrammatically in the accompanying drawings a simple form of apparatus that will suffice.

In giving this description I shall not attempt to go into all of the details of the preferred form of process of treating the oils to get rid of their lighter constituents, or many other details which are not necessary here to a clear understanding of the present invention. It will suffice to say that in the treatment of oils they are placed in treatment tank 10 in admixture with the proper amount of finely divided adsorbent clay. Several such clays are well known in the art and need no particular description here. Their property is to adsorb to themselves the impurities in the oil so that those impurities may finally be filtered out with the clay. The mixture of oil and treating clay is put into treatment tank 10 to a suitable level, and is brought up to suitable treating and finishing temperature by any suitable heating means, as by a heater 12. During this heat treatment the vapors pass off through vapor line 13 to condenser 14, and during this heat treatment the oils may be kept agitated by any suitable means, and preferably are kept agitated, at least during the latter part of their rise in temperature, by steam that may be introduced from steam line 15 through branch line 16 and the main oil pipe 17 that leads into the bottom of the treatment tank, the steam being under control of valve 18. Thus during the treatment of the oils at comparatively high temperatures (say up to a maximum of 650° F.) live dry steam is being continuously blown through the oils to keep them agitated and this steam also has the function of assisting to carry away the vapors of volatile hydrocarbons and also carries away with it all the odorous decomposition products formed during the heat treatment.

When the heat treatment is completed, then, instead of shutting off the steam from the oil during the final filtering, I keep the steam passing into the body of oil through pipe 16 during the time that the oil is passing out through pipes 17 and valve 19 to filter 20. A certain amount of steam is entrained in fine division in the oil and is carried down with the oil to the filter so that the oil in the filter carries steam with it and remains in intimate contact with the steam. During this filtration valve 21 is closed in order to build up steam pressure in treatment tank 10 and filter 20, provision being made to relieve excess pressure through relief valve 22 and thence through by-pass pipe 23 into condenser 14. It is thus evident that as filter cake 20ª builds up in the filter 20 and offers increasing resistance to flow of oil into line 24 there will be automatic increase of pressure within the treatment tank 10 and the filter 20 and that such increased pressure will be controlled by steam pressure in line 15 together with regulation of relief valve 22. The filter may be of any suitable type that will not trap steam—that is a filter of any type that will pass the steam through it along with the oil—so that the steam remains in intimate contact with the oil until the oil is entirely clear of all the clay and other filterable impurities. It is esssential that the steam pass in intimate admixture through the filter with the oil without separation; and for that purpose I make the piping arrangements from the treatment tank to the filter such as not to separate or trap steam, and I choose a type of filter that does not induce steam separation. For instance, a filter having a horizontal filtering medium 20ª operates well, as there is no tendency for the steam to rise along the filtering element as would be the case with a vertical element.

The oil and steam together pass from the filter through line 24 to any suitable separator 25 wherein, by reason of the enlarged capacity of 25 as compared to line 24, the velocity of the oil and steam stream from line 24 is retarded and the steam is thus given ample time to separate from the oil and escape through line 26 into condenser 27. The oil in 25, being now freed of steam, flows through line 28 to cooler 29, thence through pipe 35, which is so bent or constructed as to retain the oil in cooler 29 at sufficiently high level to prevent any flow of steam from separator 25 through the cooler, and valve 36 to oil storage, valves 37 and 38 being closed. Should moisture show in oil after cooling in cooler 29 the flow through line 35 can be diverted to blowing tank 39, by closing valve 36 and opening valve 38, wherein it can be blown with air introduced through line 46 and valve 40, valve 41 being closed. After having been blown dry the oil can be run to storage through valve 41 and line 42, valve 40 being closed. If it is desired, vacuum may be applied to condenser 27 and therefore to line 26 to facilitate the drawing off and separation of the steam from the oil.

The pipe 28 extends into and above the bottom of separator 25 in order to provide against any condensation of steam which might occur in 25 overflowing into line 28, it being quite obvious that should such condensation occur the water thus occasioned would immediately settle to the bottom of the separator 25 and from thence can be drawn off, from time to time, through valve 43.

The procedure here described shows how the steam is kept in intimate contact with the oil until filtration is completed. This procedure is particularly applicable to hot filtration, which in itself is desirable.

Leading from steam line 15 I show another branch line 44 controlled by valve 45 which leads to the oil line 17 below valve 19. This steam line is supplied for the purpose of insuring the oil passing to the filter being in contact with a sufficient amount of steam to absorb and finally carry away all odorant that may be formed, in event valve 19, for any reason, should be closed thus cutting off flow of steam into filter from line 16.

It will be apparent to those skilled in this art, that various modifications both of procedure and of apparatus may be used. I describe only one type of apparatus merely for the purpose of clearly illustrating a suitable means for the carrying out of my process. The apparatus used need not be in the form illustrated, as apparatus of different construction may be used, provided such construction embodies means for carrying out the essential steps of this invention. These essential steps are: First—to heat the oil to a suitable temperature with a suitable adsorbent material in the presence of steam for the carrying away of decomposition products; second—maintaining the oil in agitation with the solid adsorbent during a sufficient time to allow the adsorbent to expend itself in purifying the oil; and thereafter to pass the oil and spent adsorbent in intermixture with steam through a filter of such construction as will not permit the steam and oil to separate within such filter, and at a temperature sufficiently high to prevent the condensation of steam; and finally—to remove the steam from the filtered oil after separation of the oil from the spent adsorbent. In other words, the method contemplates keeping steam in intimate contact with the oil throughout that period during which the heated oil is in contact with the clay, or that period in which the formation of odorant takes place.

I claim:

1. In the separation of spent adsorbent from highly heated oils in a closed filtering system under pressure on the inlet side, said system having a foraminous filtering medium, the step comprising: simultaneously passing through the foraminous medium a flow of steam and a flow of highly heated oil containing spent adsorbent, said steam being entrained in said oil during said passage; and retaining said adsorbent on said medium, thereby separating it from said oil and entrained steam.

2. In a method involving the treatment of oils with adsorbent bodies at high temperatures, in a substantially closed vessel, and the subsequent separation of the spent adsorbent from the oil at high temperature, in a closed filtering system under pressure on the inlet side, said system having a foraminous medium, the steps comprising: simultaneously forcing said oil and said adsorbent, together with steam entrained therein, against the foraminous medium; retaining said adsorbent on said medium and thereby separating it from said oil and steam; passing said oil and the steam entrained therein through said medium and through the layer of adsorbent collecting thereon, and finally separating said steam, without condensation thereof, from the adsorbent-free oil.

In witness that I claim the foregoing I have hereunto subscribed my name this 17th day of September, 1925.

VICTOR C. BENJAMIN.